Patented June 13, 1933

1,914,052

UNITED STATES PATENT OFFICE

FRITZ STRAUB, OF BASEL, AND HERMANN SCHNEIDER, OF RIEHEN NEAR BASEL, SWITZERLAND, ASSIGNORS TO SOCIETY OF CHEMICAL INDUSTRY IN BASLE, OF BASEL, SWITZERLAND

DYESTUFFS CONTAINING CHROMIUM AND PROCESS OF MAKING SAME

No Drawing. Application filed September 16, 1930, Serial No. 482,364, and in Switzerland September 26, 1929.

The present invention relates to the manufacture of dyestuffs containing chromium. It comprises the process of making these dyestuffs, the dyestuffs themselves, and the material that has been dyed with the new dyestuffs.

By this invention valuable new dyestuffs containing chromium are obtained by treating the azo-dyestuffs derived from 1-diazo-2-hydroxynaphthalene-4-sulfonic acids and naphthols of the general formula

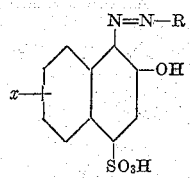

wherein $x$ stands for H or $NO_2$, and R means an unsubstituted naphthol radicle, with agents yielding chromium, in the presence of such quantities of alkali metal ions which neither tend to salt out the dyestuff, nor unfavorably influence the dyeing properties of the product, and evaporating the solution of the reaction.

The new dyestuffs containing chromium may be regarded as intermediate products of the hitherto known chromium compounds. They are sensitive towards dilute mineral acids in that they partly precipitate for instance in a dye-bath containing sulfuric acid and do not therefore yield fast dyeings. Further, they are distinguished by a very good solubility in water, and are therefore obtained by evaporation.

The present chroming process can also first lead to dyestuffs which are with difficulty soluble in water. By treatment with dilute alkalies, such for example as dilute caustic soda solution or caustic potash solution, these dyestuffs can then be converted into products which are easily soluble in water.

The new chromium compounds may be used for dyeing animal fibers according to the process described in the copending specification Serial No. 482,155, filed September 15, 1930 by conducting the dyeing operation at first in a weakly acid bath, and thereafter developing the dyeings in a bath containing a stronger acid. The dyeings thus produced are fast, particularly to fulling and potting. At the second stage—the development—a new complex is formed on the fiber.

As the chroming agent there may be used quite generally the usual agents, for example, chromium chloride, chromium fluoride, chromium sulfate, chromium sulfite, chromium acetate, chromium formate, chromium oxalate, chromium hydroxide, a chromium salt of an aromatic sulfonic acid, or the like, or a mixture of any of these chroming agents, with or without the usual additions. Simultaneously with the chroming, which by observing suitable conditions, may be conducted under pressure, other reactions as for instance reduction may also occur.

The new dyestuffs are useful not only for dyeing animal fiber, but also for printing, for dyeing leather and for coloring varnishes.

The following examples illustrate the invention, the parts being by weight:—

*Example 1*

46.2 parts of the purified dyestuff of the formula

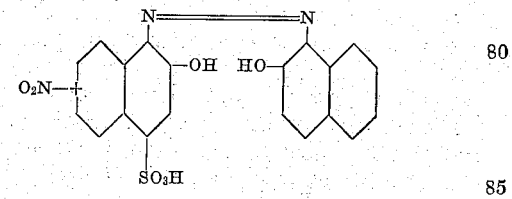

obtained from nitrated 1-diazo-2-hydroxynaphthalene-4-sulfonic acid and β-naphthol are introduced whilst stirring into 2000 parts of boiling water. When dissolution has occurred there are added 51 parts of sodium formate and 125 parts of a solution of chromium fluoride containing 15.2 parts of $Cr_2O_3$. The whole is then boiled in an open vessel, with simultaneous evaporation, until a sample shows that the complex which has been formed is easily soluble in water and is not precipitated during dyeing by dilute organic acids. The reaction mixture is then filtered from any insoluble matter and the reddish violet-black solution is evaporated to dryness under reduced pressure. There is thus obtained a chromium compound in the form of a crumbling reddish black mass which dissolves easily in water to a blackish red-violet solution.

Example 2

To a solution prepared by dissolving 55 parts of the dyestuff from nitrated 1-diazo-2-hydroxynaphthalene-4-sulfonic acid and β-naphthol in 2000 parts of boiling water, there are added 74 parts of a solution of chromium fluoride of 12.5 per cent. strength (containing 9.24 parts of $Cr_2O_3$) and 40 parts of sodium formate dissolved in 100 parts of water. The whole is boiled in an open vessel until a sample shows that the complex has the properties indicated in Example 1, whereupon the product is isolated in the manner described in that example. The dyestuff so obtained resembles closely in its properties the product described in Example 1.

Example 3

41.7 parts of the dyestuff of the formula

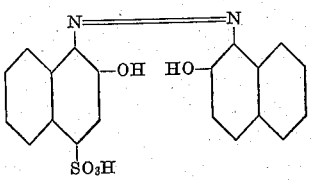

obtained from 1-diazo-2-hydroxynaphthalene-4-sulfonic acid and β-naphthol are dissolved in 1500 parts of boiling water and the solution is boiled for 6–7 hours together with 66 parts of a solution of chromium oxalate of 14 per cent. strength containing 9.2 parts of $Cr_2O_3$. The whole is cooled to 50° C., the suspension of the chromium compound which is thus formed is brought into solution by the addition of caustic soda solution of 10 per cent. strength, and the solution is thereupon neutralized by the addition of a quantity of acetic acid equivalent to the caustic soda solution, and the new chromium compound is thereupon obtained by evaporation. It is soluble in water to a reddish black-blue solution and dyes wool dark blue tints.

Example 4

46.2 parts of the dyestuff from nitrated 1-diazo-2-hydroxynaphthalene-4-sulfonic acid and β-naphthol are dissolved in 1000 parts of water having a temperature of 50° C., with the addition of 8 parts of a caustic soda solution of 30° Bé. There are added to the solution 200 parts of a solution of chromium sulfite containing 8 parts of $Cr_2O_3$, and the whole is boiled in a reflux apparatus for three hours, whereupon a further 20 parts of a chromium sulfite solution containing 4 per cent. of $Cr_2O_3$ are added and boiling is continued for half an hour. The whole is then filtered and evaporated to dryness under reduced pressure. The dyestuff so obtained dyes wool in an acid bath deep black tints of remarkable fastness.

Example 5

46.2 parts of the dyestuff from nitrated 1-diazo-2-hydroxynaphthalene-4-sulfonic acid and β-naphthol are dissolved in 1200 parts of water with the addition of 8 parts of a caustic soda solution of 30° Bé. 110 parts of a solution of sodium bisulfite of 40 per cent. strength and 83 parts of a solution of chromium sulfate containing 10 per cent. of $Cr_2O_3$ are then added, and the whole is boiled in a reflux apparatus for six hours. The solution is then neutralized at the boiling temperature by the addition of sodium carbonate and filtered and evaporated to dryness under reduced pressure. The cromium compound thus obtained dyes wool in an acid bath black tints having very good fastness properties.

Example 6

41 parts of the dyestuff of the formula

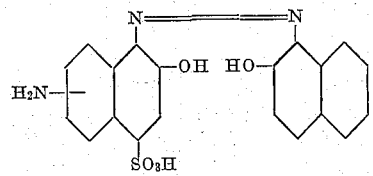

obtained from nitrated 1-diazo-2-hydroxynaphthalene-4-sulfonic acid and β-naphthol, and reduced by heating with sodium sulfide, are dissolved in 1500 parts of hot water with the addition of 6 parts of a caustic soda solution of 30° Bé. To the solution there are added first 13.6 parts of crystallized sodium acetate and then 46 parts of a solution of chromium fluoride of 9 per cent. strength, and 37 parts of a cromium oxalate solution of 11.5 per cent. strength. The whole is boiled in a reflux apparatus for 4 hours, clarified by filtration, and the dyestuff is precipitated by evaporation, filtered and dried in the usual manner. The dyestuff dissolves in water to a blue solution and dyes wool in an acid bath very fast blue-green to black tints.

Example 7

46.2 parts of the dyestuff of the formula

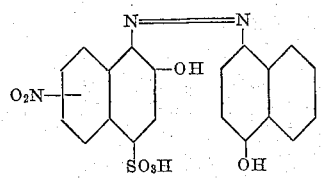

obtained from nitrated 1-diazo-2-hydroxynaphthalene-4-sulfonic acid and α-naphthol are dissolved in 1200 parts of hot water. There are added to the solution 13.6 parts of sodium formate, 37 parts of a solution of chromium oxalate containing 11.5 per cent. of $Cr_2O_3$ and 47 parts of a solution of chromium fluoride containing 9 per cent. of $Cr_2O_3$. The whole is boiled for 1 hour, clarified by filtration and evaporated to dryness at a temperature of 50–60° C. under reduced pressure. The chromium compound so obtained dyes wool black tints of very good fastness properties.

Example 8

50 parts of the dyestuff from nitrated 1-diazo-2-hydroxynaphthalene-4-sulfonic acid and α-naphthol are dissolved by boiling in 1000 parts of water. There are then added 7 parts of sodium formate, 40 parts of a solution of chromium oxalate containing 11.5 per cent. of $Cr_2O_3$ and 50 parts of a solution of chromium fluoride containing 9 per cent. of $Cr_2O_3$ and the whole is boiled for half an hour. The liquid is filtered until clear and evaporated to dryness under reduced pressure. There is obtained a dyestuff containing chromium which is very easily soluble; it is absorbed in presence of formic acid by wool, on which it yields a blackish violet-brown color which is developed by means of sulfuric acid to pure black tints which are well equalized.

Example 9

42 parts of the dyestuff of the formula

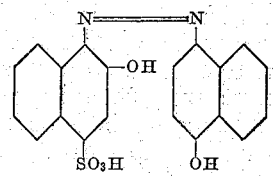

obtained from 1-diazo-2-hydroxynaphthalene-4-sulfonic acid and α-naphthol are dissolved in 800 parts of hot water. There are added 13.6 parts of sodium formate and 95 parts of a solution of chromium fluoride of 9 percent strength (containing 8.5 parts of $Cr_2O_3$) and the whole is boiled for three hours in a reflux apparatus. A sample of the reaction mixture yields on wool in presence of acetic acid a blue dyeing, whereas wool is dyed by a sample in a sulfuric acid bath in the violet dyeing of the parent dyestuff. The chromium compound is isolated by evaporating the reaction mixture to dryness under a reduced pressure. It dyes wool in a weakly acid bath blue tints of very good fastness, which can be developed by means of sulfuric acid.

Example 10

46.2 parts of the dyestuff from nitrated 1-diazo-2-hydroxynaphthalene-4-sulfonic acid and β-naphthol are suspended in 1500 parts of water, whereupon there are added 9 parts of sodium formate, 13.2 parts of anhydrous sodium sulfite and 120 parts of a solution of chromium oxalate chloride of 7.6 per cent. strength, containing 9.1 parts of $Cr_2O_3$. The whole is boiled for three hours, after which time the dyestuff is passed into solution, thereupon the solution is evaporated to dryness under reduced pressure if necessary after it has been filtered.

The chromium oxalate chloride solution used in this example is prepared by stirring together at 50–60° C. 152 parts of $Cr_2O_3$ in the form of a paste of 13.2 percent strength and 126 parts of oxalic acid with addition of 770 parts by volume of hydrochloric acid of 16 per cent. strength, heating until all is passed into solution and making up to 2000 parts.

Example 11

46.2 parts of the dyestuff from nitrated 1-diazo-2-hydroxynaphthalene-4-sulfonic acid and β-naphthol are suspended in 1500 parts of water and there are added 9 parts of sodium formate, 12.6 parts of anhydrous sodium sulfite, and 100 parts of a chromium oxalate sulfate solution containing 9.1 parts of $Cr_2O_3$. The reaction mixture is worked up in the manner indicated in the preceding example.

The chromium oxalate sulfate solution used in this example is prepared in the following manner:—152 parts of $Cr_2O_3$ in the form of a paste of 12.6 per cent. strength are heated to 50–60° C. with 126 parts of oxalic acid whilst stirring; 408 parts of cold sulfuric acid of 48 per cent. strength are added to the thin pasty mass and the whole is heated on the water bath until dissolution has occurred and is made up to 1670 parts.

The chroming operation described in the foregoing examples may be varied greatly; for example, it may be conducted with purely inorganic agents, such as chromium fluoride, or chromium fluoride and sodium sulfite; or with a mixture of chromium acetate and sodium acetate; of chromium sulfate, sodium bisulfite and sodium acetate; of chromium fluoride and chromium oxalate, or chromium fluoride, chromium formate and sodium formate, of chromium oxalate and sodium acetate. There may also be used a chromium salt and an organic sulfonic acid, a chromium salt of an organic sulfonic acid, or the like.

What we claim is:—

1. A process for the manufacture of dyestuffs containing chromium, consisting in treating the azo-dyestuffs of the general formula

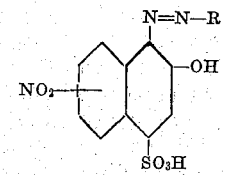

wherein R stands for an unsubstituted naphthol radicle, with agents yielding chromium, in the presence of such quantities of alkali metal ions which neither tend to salt out the dyestuff, nor unfavorably influence the dyeing properties of the product, and evaporating the solution of the reaction.

2. A process for the manufacture of dyestuffs containing chromium, consisting in treating the azo-dyestuffs of the general formula

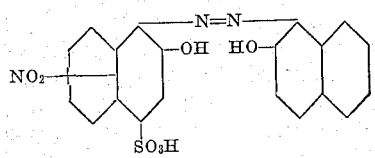

with agents yielding chromium, in presence of such quantities of alkali metal ions which neither tend to salt out the dyestuff nor unfavorably influence the dyeing properties of the dyestuff, and evaporating the solution of the reaction.

3. A process for the manufacture of a dyestuff containing chromium, consisting in treating the azo-dyestuff of the formula

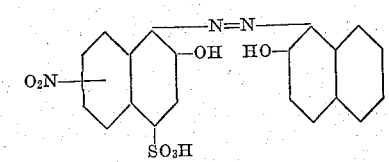

with chromium fluoride, in presence of such quantities of alkali metal ions which neither tend to salt out the dyestuff nor unfavorably influence the dyeing properties of the dyestuff, and evaporating the solution of the reaction.

4. The dyestuffs containing chromium which are obtained by treating the azo-dyestuffs of the general formula

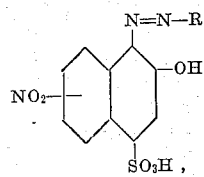

wherein R stands for an unsubstituted naphthol radicle, with agents yielding chromium, in presence of such quantities of alkali metal ions which neither tend to salt out the dyestuff, nor unfavorably influence the dyeing properties of the dyestuff, and evaporating the solution of the reaction, which products are darkly colored powders, are easily soluble in water, are partly precipitated in a dye-bath containing sulfuric acid, are absorbed by the fiber from a weakly acid dye-bath, and can then be converted on the fiber into new complexes by development in a dye-bath of increased acidity, and dye the animal fiber blue-grey and black tints.

5. The dyestuffs containing chromium which are obtained by treating the azo-dyestuff of the formula

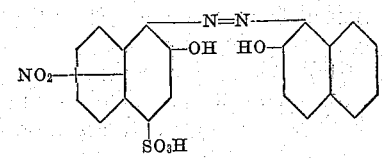

with agents yielding chromium, in presence of such quantities of alkali metal ions which neither tend to salt out the dyestuff, nor unfavorably influence the dyeing properties of the dyestuff, and evaporating the solution of the reaction, which products are darkly colored powders, are easily soluble in water, are partly precipitated in a dye-bath containing sulfuric acid, are absorbed by the fiber from a weakly acid dye-bath, and can then be converted on the fiber into new complexes by development in a dye-bath of increased acidity, and dye the animal fiber blue-grey and black tints.

6. The dyestuff containing chromium which is obtained by treating the azo-dyestuff of the formula

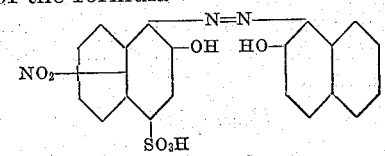

with chromium fluoride, in presence of such quantities of alkali metal ions which neither tend to salt out the dyestuff, nor unfavorably influence the dyeing properties of the dyestuff, and evaporating the solution of the reaction, which product is a darkly colored powder, is easily soluble in water, is partly precipitated in a dye-bath containing sulfuric acid, is absorbed by the fiber from a weakly acid dye-bath, and can then be converted on the fiber into a new complex by development in a dye-bath of increased acidity, and dyes the animal fiber grey to black tints.

In witness whereof we have hereunto signed our names this 6th day of September 1930.

FRITZ STRAUB.
HERMANN SCHNEIDER.